३,७५८,४९७
PROCESS FOR THE PRODUCTION OF DEEPLY
COLOURED, TRANSPARENT PIGMENTS OF
THE ISOINDOLINE SERIES
Andre Pugin and Jost von der Crone, Riehen, Switzerland, assignors to Ciba-Geigy AG, Basel, Switzerland
No Drawing. Continuation-in-part of abandoned application Ser. No. 807,918, Mar. 17, 1969. This application July 12, 1971, Ser. No. 162,023
Claims priority, application Switzerland, Mar. 21, 1968, 4,328/68
Int. Cl. C08b 45/66; C08c 11/76; C09b 7/02
U.S. Cl. 260—325                                           8 Claims

ABSTRACT OF THE DISCLOSURE

A process for the production of deeply coloured, transparent isoindoline pigments is described which comprises production of a salt of the pigment by reaction with a base, and subsequent conversion of the salt to the pigment in its free, acidic form. Processes of colouring printing inks, lacquers and synthetic plastics materials with the aid of the thus treated pigments of increased color-depth and transparency are also disclosed.

---

This application is a continuation-in-part of our application Ser. No. 807,918, filed on Mar. 17, 1969 and now abandoned.

DESCRIPTION OF THE INVENTION

The present invention concerns deeply coloured isoindoline pigments with improved transparency, especially 1-imino-isoindolin-3-one and 1,3-diiminoisoindoline pigments, their use for the pigmenting of organic materials, in particular printing inks, lacquers and plastics and, as an industrial product, the organic material pigmented therewith.

The successful dyeing of plastics with coloured pigments requires that the pigment dyestuff be in a very stable, finely dispersed form. The obtainment of pigments in a finely dispersed form usually entails, for example, the grinding of the pigment with subsequently removable grinding auxiliaries and often in the presence of small amounts of organic solvents, a heat treatment in suitable solvents, or its dissolution and reprecipitation, e.g. from concentrated sulphuric acid with water. Pigments of the isoindoline series treated in this manner do not satisfy, with regard to their colour strength and/or purity, present day requirements for pigments. They are moreover lacking in the necessary transparency for certain applications such as the dyeing of metal effect lacquers, transparent lacquers and films or synthetic leather. The term transparency denotes the property of a pigment, in a suitable binding agent and applied as a thin layer, to be permeable to light and to leave the structure of the substrate more or less completely visible.

A novel process has now been found by which coloured pigments of the isoindoline series are obtained which have a surprising degree of purity, colour strength, dispersibility and very good transparency. These pigments are obtained by suspending the raw pigment of the 1-imino-isoindolin-3-one or 1,3-diimino-isoindoline series, which contain an acid NH-group in 2-position, in hydrophilic organic solvents, reacting it with bases capable of salt formation—optionally in the presence of a dispersing agent—and using thereby such amounts of hydrophilic organic solvent that an extensive degree of solution of the pigment salt occurs, and recovering from the salt the free isoindoline by hydrolysis or by means of acid.

The isoindoline pigments of the 1-imino-isoindolin-3-one and 1,3-diimino-isoindoline series, which are usable according to the invention, correspond to the general Formulae I and II:

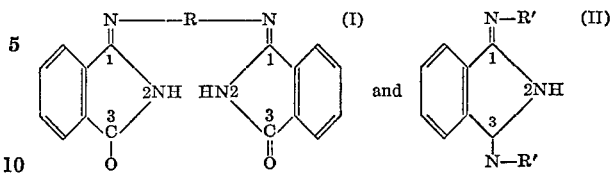

respectively, wherein

R represents a carbo- or heterocyclic bridge member and
R' represents a phenyl radical, unsubstituted or non-ionogenically substituted, or a condensed phenyl radical, or a heterocyclic aromatic radical.

The isoindoline compounds of the Formulae I and II can be advantageously further substituted in the benzo ring, e.g. by halogen substituents such as chlorine, bromine or fluorine. Of particular interest technically are the tetrahalogen compounds and of these, in particular, the tetrachloro compounds. Optionally, other substituents, which are stable under the reaction conditions, can be present, in addition to or in place of halogens.

The starting materials of the Formulae I and II are known and can be produced according to known methods. (cp. Swiss Pats. 346,218, 363,979, 348,496 and 363,980; Belgian Pats. 686,728 and 663,218; U.S. Pat. 2,537,352; German Pats. 955,178 and 950,800; and French Pat. 1,251,052.)

The hydrophilic organic solvents, usable for the present process either singly or in combination, should possess for the pigment salts as high as possible a dissolving power and are, e.g. nitriles such as acetonitrile; monovalent lower aliphatic alcohols such as methanol, ethanol, n- or iso-propanol, n- and sec. butanol and glycol; functional derivatives of ethylene glycol such as ethylene glycol monomethyl ether or -ethyl ether; lower aliphatic ketones such as acetone; cyclic aliphatic ethers such as dioxane; amines such as dimethylamine, ethylene diamine, ethanolamine, dimethyl aniline, quinoline, piperidine, pyridine or morpholine; lower aliphatic carboxylic acid amides such as dimethyl acetamide or dimethyl formamide; heterocyclic compounds such as furfuryl alcohol, tetrahydrofurfuryl alcohol, tetrahydrothiophendioxide, N-methyl pyrrolidone-2; and dialkyl sulphoxides such as dimethyl sulphoxide.

Mixtures of dimethyl formamide, N-methyl pyrrolidone and pyridine with alcohols such as methanol, isopropanol or ethylene glycol monomethyl ether, have likewise proved to be satisfactory.

On account of their high dissolving power, dimethyl formamide, isopropanol or pyridine, or mixtures thereof, are particularly suitable.

The amount of the hydrophilic organic solvent depends on the nature of the pigment and the solvent. Good results are obtained, when at least 2 parts of the solvent is used per part of pigment. However also considerably lower amounts of solvents such as 0.5 part per part of pigment can be used with success. The upper limit for the solvent amount is only determined by commercial considerations.

Bases, capable of salt formation and suitable for the present process, can be of either inorganic or organic nature. It is thus possible to use, e.g. the hydroxides, carbonates, amides or advantageously the alcoholates of the alkali metals such as, e.g. lithium, sodium or potassium hydroxide, sodium or potassium carbonate, sodium ethylate, especially sodium methylate, or lithium amide, or also quaternary ammonium hydroxides such as, e.g. benzyl-trimethyl ammonium hydroxide or hydrazine. Also suitable are alkaline-earth metal hydroxides and -oxides such as, e.g. barium hydroxide or barium oxide.

It has been shown that after addition of the bases, a small addition of water is advantageous with regard to the solubility of the alkali salt.

Suitable as dispersing agents are anion active ones, especially the ones known as colophonium soaps; non-ionogenic dispersing agents such as, e.g. the addition products of alkylene oxides, particularly ethylene oxide, to higher fatty acids, fatty acid amides, aliphatic alcohols or alkyl phenols; and cation active dispersing agents such as, e.g. alkyl ammonium polyglycol ether.

In accordance with the invention, the pigment of the Formula I or II, or also mixtures of pigments of the Formula I and/or II, are suspended in a hydrophilic organic solvent and this suspension is mixed with a base, which is capable of salt formation, at room temperature, optionally in the present of a dispersing agent. The amount of the base added, which is capable of salt formation, is such that per acid NH-group there is present at least 1 equivalent base. In order to obtain the desired transparency, it is however not absolutely necessary for a complete solution to be obtained; a good degree of solution will suffice and this has an advantage in that smaller amounts of hydrophilic organic solvent are required.

The formation of the pigment salt generally occurs instantaneously. The reaction is preferably carried out at room temperature but, optionally, it can be completed by slight warming at a temperature of ca. 70–75° C. during 10–30 minutes. In general, it suffices if the solutions are stirred at room temperature for about 10–60 minutes. In the case of a suspension, however, it is advantageous to stir the mixture for a longer period, i.e. about 1 to 3 hours. This formation of pigment salt is usually recognizable by virtue of a change of colour of the reaction mixture. An isolation of the formed pigment salt is not necessary.

The obtaining of the free pigments of the isoindoline series occurs, depending on the hydrophilic organic solvent used, at temperatures of ca. 0° to 150° C., advantageously however at room temperature, by hydrolysis of the pigment salts with water or by means of acid. A mineral acid can be used as the acid, e.g. sulfuric acid or hydrochloric acid, advantageously however a lower aliphatic carboxylic acid, especially acetic acid or diluted acetic acid. The hydrolysis is performed or the addition of acid is made advantageously by mixing the reaction mixture, while stirring vigorously, with water or acid, or conversely the reaction mixture is poured into water or acid. The obtained suspension is thereupon advantageously stirred for a further 15 minutes to 2 hours at room temperature, the obtained isoindoline pigment is filtered off, washed neutral with water and is dried.

A modification of the process according to the invention consists of condensing a salt of an isoindolin-3-one, which has exchangeable substituents in 1-position, with a diamine of the general Formula III,

$$H_2N-R_1-NH_2 \qquad (III)$$

wherein $R_1$ represents a carbo or heterocyclic bridge member, which possesses hydrogen atoms in o-position for the N-bond, in a hydrophilic organic solvent and thereby, or subsequently, using such amounts of hydrophilic organic solvent that an appreciable dissolving of the pigment salt occurs, and recovering from this solution, optionally in the presence of a dispersing agent, the free isoindoline by hydrolysis or by means of acid.

The meaning of $R_1$ corresponds to the meaning of R in Formula I with the reservation that the carbo- or heterocyclic bridge member possesses hydrogen atoms in o-position for the N-bond.

By exchangeable substituents is meant those which, with regard to type and number, take up two bonds and which are more mobile than the doubly linked oxygen in the isoindolin-3-one. For example, the salts of the isoindolin-3-ones, which are usable as starting materials, contain in 1-position two secondary amino groups, in particular piperidino or morpholino groups; preferably they contain, however, two alkoxy groups such as, e.g. methoxy or ethoxy groups.

These starting materials are known and can be produced by known methods. These salts are obtained, for example, from the optionally substituted 2-cyanobenzoic acid esters, such as the -methyl or -ethyl ester, with alcoholates such as, e.g. sodium methylate in the presence of alcohol, such as methanol or ethanol.

The condensation of the diamine of the Formula III with the salt of the isoindolin-3-one having in 1-position a reactive substituent occurs in the cold state, but optionally with heating of the intimately mixed components, with water-miscible organic solvents such as, e.g. lower aliphatic alcohols such as lower alkanols, for example methanol or ethanol; lower cyclic ethers such as dioxane; lower aliphatic ketones such as acetone; or functional derivatives of ethylene glycol such as, e.g. ethylene glycol monomethyl ether.

After condensation is finished, the pigments are present directly in salt form and are then prepared, as described in the first process, optionally in the presence of a dispersing agent.

In this case too, as described in the first process, the amount of hydrophilic organic solvent added is such that a high degree of solution of the pigment salt occurs.

This modified process has the great advantage that the production and formulation of the pigments are carried out in one operation in the same reaction vessel (one vessel process) and that the procedure can be carried out entirely at room temperature.

The isolated deeply-coloured transparent pigments, obtained according to the invention, can be converted, if this is desired, into a finely dispersed, crystalline form by suspending them, e.g. in an organic solvent such as for example chlorobenzene, and refluxing at a maximum temperature of 130° C. for 1 to 2 hours. After cooling, finely crystalline pigments are obtained, which have retained, to a great extent, their valuable transparent properties.

The transparent pigments, obtainable according to the invention using one of the two processes, are, compared with the starting pigments of the same chemical structure, characterised by their high colour strength and purity as well as, in particular, by their high transparency and, in conjunction with dispersing agents, also by their excellent dispersibility.

The pigments existing in the finely divided form are suitable for the pigmenting of printing inks, lacquers, plastics and synthetic fibres. Examples of these are: natural resins and drying oils such as linseed oil varnish; regenerated cellulose fibres such as viscose fibres, cellulose derivatives such as nitrocellulose; cellulose acetate, cellulose acetate butyrate mixed esters, rubber, polyvinyl chloride, polyethylene, polypropylene, polyvinyl acetate, polyacrylonitrile, polyacrylic acid ester and polymethacrylic acid ester, polystyrene, acrylate-butadiene-styrene terpolymers, polyesters of the type—ethylene glycol terephthalic acid polycondensates or unsaturated polyester resins such as maleinate resins; also alkyd resins, especially oil-modified vinyl, methacrylic and epoxyd resins, as well as thermoplastic and curable acrylic resins, ureas and melamine formaldehyde resins, the condensation products of phenols, amines and amides with formaldehyde. The pigments obtained according to the invention are especially suitable for the pigmenting of stoving lacquers based on curable acrylic resins or melamine formaldehyde condensates, as well as for the pigmenting of hard and soft polyvinyl chloride plastics.

The addition of the isoindoline pigments, produced according to the invention, to these polymeric materials is carried out, for example, by mixing the pigment with the latter using mixing rollers, mixing and grinding equipment. A further possibility with regard to the processing of the pigment consists of converting the pigment, using known methods and in combination with auxiliary agents such as rubber, softeners, e.g., dioctyl phthalate, natural and synthetic resins, cellulose derivatives, e.g. nitrocellulose, into concentrates, master batches, chips, granulates or similar preparations, which can be particularly easily worked into the materials to be pigmented.

The addition of the conditioned isoindoline pigments, in consequence of their colour strength nad brilliancy, has a particularly favourable effect in the case of the melt-spinning process.

The pigmented printing inks, lacquers and plastics generally contain amounts of 0.01 to 30 percent by weight of isoindoline pigment, relative to the starting material to be pigmented. The amount of pigment to be used depends mainly on the desired colour strength, also on the thickness of the coating on the shaped article and, finally, optionally on the content of white pigment in the polymer.

The organic materials pigmented using the new pigment preparations, especially the preparations obtained from the tetrahalogen isoindolines of the Formulae I and II, are characterised by their very good stability to heat, fastness to cross-lacquering, migration and light, especially however by their excellent fastness to weathering in combination with metal powders. Since the obtained organic materials also have a high degree of transparency, the pigments of the isoindoline series, produced according to the invention, are particularly suitable for the production of metal-effect dyeings in lacquers and plastics, for which there is a great demand today in the automobile industry.

The following examples illustrate the invention. The temperatures are given in degrees centigrade.

Example 1

15 g. of bis-[4,5,6,7 - tetrachloro-isoindoline-3-one-1-ylidene]-phenylene diamine (1,4), which has a specific surface area of 22 m.$^2$/g. (determination by means of nitrogen adsorption according to the BET-method [Brunnauer, Emmet, Teller; J. Am. Chem. Soc. 60, 309 (1938]) are slurried in 150 ml. of dimethyl formamide at room temperature. While stirring, 50 ml. of a 1 N methanolic sodium methylate solution are poured into the yellow suspension, whereby a clear yellow solution of the sodium salt of the applied isoindoline is formed. After stirring for one hour at room temperature, the solution is mixed with 500 ml. of water, the obtained precipitate is filtered off, the filtrate washed neutral with water and dried in vacuo at 60°—yield 14 g. The thus conditioned pigment has a specific surface area of 75 m.$^2$/g. (determination by means of the BET-method).

When this pigment is used in stoving varnishes, a much more deeply coloured, purer and more transparent dyeing is obtained, compared with that obtained using the starting pigment, whereby the shade of the dyeing changes from the original reddish yellow to greenish yellow.

If the hydrolysis, as described in this example, is performed, not with 500 ml. of water, but with 10 ml. of glacial acetic acid or with a mixture of 10 ml. of glacial acetic acid and 500 ml. of water, under otherwise the same conditions as stated in this example, then similar transparent pigments are obtained having a specific surface area of 65 m.$^2$/g. and 75 m.$^2$/g. respectively.

If the starting pigment is subsequently treated, not as described in this example by hydrolysis of the alkali salt of the pigment, but by salt grinding of the starting pigment, then a conditioned pigment is obtained which, moreover, is less transparent, less deeply coloured and less brilliant.

If instead of using in this example the 150 ml. of dimethyl formamide, equal amounts of the solvents given in the following table are used, the procedure being otherwise as described in this example, then conditioned pigments are obtained having similarly valuable properties.

TABLE I

Solvent

N-methyl pyrrolidone-2
Dimethyl sulphoxide
Dimethyl acetamide

If instead of using in this example the 150 ml. of dimethyl formamide, equal amounts of the solvents given in the following table are used, the procedure being otherwise analogous to the conditions described in this example, there occurs no complete solution of the sodium salt of the pigment. The isolated hydrolysed pigments possess, however, the same valuable properties.

TABLE II

Solvent

Ethylene glycol monomethyl ether
Ethylene glycol monoethyl ether
Isopropanol\*
Sec. butanol
Tetrahydrofurfuryl alcohol
Dioxane
Acetonitrile \*Specific surface area of the pigment conditioned with this solvent: 70 m.$^2$/g.

Example 2

15 g. of bis-[4,5,6,7-tetrachloro-isoindolin-3-one-1-ylidene] - 1 - methyl-phenylene diamine-(2,6) are suspended in 500 ml. of dimethyl formamide at room temperature and mixed with 50 ml. of a 1 N methanolic sodium methylate solution, whereby solution occurs almost instantaneously. After stirring for 10 minutes, this solution is poured into a vigorously stirred mixture of 1 litre of water and 20 ml. of acetic acid. The obtained greenish yellow, fine precipitate is then filtered off, the filtrate washed acid free with water and is dried in vacuo at 60°.

When this pigment is used in stoving lacquers, a pure, greenish yellow dyeing of good colour strength and transparency is obtained. The pigment has an appreciably better colour strength and brilliancy and a considerably higher degree of transparency in comparison with that obtained with the starting pigment.

If 10 g. of this conditioned pigment in 150 ml. of o-dichlorobenzene are heated, while stirring, for 2 hours at 130°, subsequently cooled to 100°, filtered hot, the filtrate being washed with alcohol and dried in vacuo at 60°, then the pigment is obtained in a fine crystalline form. When used in stoving lacquers, the subsequently treated pigment exhibits similarly valuable properties to the conditioned pigment.

If instead of using the 15 g. of bis-[4,5,6,7-tetrachloro-isoindolin - 3 - one - 1 - ylidene]-1 -methyl-phenylene diamine-(2,6), equal amounts of the pigments listed in the following Table III, column II, are used, the procedure used being otherwise the same as described in this example, then conditioned pigments are likewise obtained having the same valuable properties, the shades of which are given in column III of the table.

TABLE III

| I | II | III |
|---|---|---|
| No. | Bis-[4,5,6,7-tetrachloro-isoindolin-3-one-1-ylidene]- | Shade of the conditioned pigment |
| 3 | -phenylene diamine (1,3) | Greenish yellow. |
| 4 | -diphenylene diamine (2,2') | Do. |
| 5 | -diphenylene diamine (4,4') | Orange. |
| 6 | -dibenzofuryl-diamine (2,8) | Yellow. |
| 7 | -3,3'-dimethyl diphenylene diamine (4,4') | Red. |
| 8 | -2,2'-dimethyl diphenylene diamine (4,4') | Yellow. |
| 9 | -2-methoxy-phenylene diamine (1,4) | Yellow-orange. |

Example 10

100 g. of bis-[4,5,6,7-tetrachloro-isoindolin-3-one-1-ylidene] - 3,3' - dimethoxy - diphenylene diamine-(4,4') are suspended at room temperature in 1000 ml. of pyridine. After the addition of 260 ml. of methanolic 1 N sodium methylate solution, the colour of the solution changes from being initially red to yellow. The mixture is stirred for 10 minutes at room temperature and, following this, a solution of 10 g. of colophonium in 4 g. of aqueous 30% sodium hydroxide solution and 250 ml. of water is added, whereby complete solution occurs. This solution is then added, while stirring well, to a mixture of 3000 ml. of water and 150 ml. of acetic acid. The obtained fine, red precipitate is filtered off, washed with water and dried in vacuo at 60°. 98 g. of a yellowish red pigment powder is obtained, which is distinguished by a good dispersibility and which is particularly suitable for the pigmenting of stoving lacquers, giving deeply coloured, reddish yellow shades with a high degree of transparency. Corresponding dyeings with the starting pigment are much duller, weaker in colour and not transparent.

If instead of using the 1000 ml. of pyridine, a mixture of 600 ml. of pyridine and 600 ml. of dimethyl formamide is used, or a mixture of 2000 ml. of dimethyl formamide and 1000 ml. of isopropanol, conditioned pigments are obtained which exhibit similar valuable properties.

Example 11

15 g. of bis - [4,5,6,7 - tetrachloro-indolin-3-one-1-ylidene]-2 -methyl-phenylene diamine-(1,3) are added at room temperature to a mixture of 150 ml. of isopropanol and 5 g. of pulverised potassium hydroxide and slurried for several minutes. After addition of 50 ml. of water, a solution is obtained. After stirring for one hour at room temperature, the solution is mixed, while stirring well, firstly with 500 ml. of water and subsequently with 20 ml. of acetic acid. The obtained yellow precipitate is filtered off, washed with water and dried in vacuo at 50°. With stoving lacquers containing this pigment, greenish yellow, highly transparent dyeings are obtained, which are characterised by a high colour strength and purity and, at the same time, excellent fastnesses such as, e.g. fastness to cross-lacquering and to light. If the thus treated pigment is processed into soft polyvinyl chloride or hard polyvinyl chloride, it is shown to be, in reduction with white pigment, deeply coloured, greenish yellow, fast to migration with very good fastness to light and weathering.

If instead of using this example 5 g. of pulverised potassium hydroxide, 2 g. of lithium amide are used, with the procedure being otherwise as described in the example, an equally highly transparent pigment is obtained having similar properties.

Example 12

10 g. of bis-[4,5,6,7-tetrachloro-isoindolin-3 - one - 1-ylidene]-phenylene diamine-(1,3) are suspended at room temperature in 200 ml. of morpholine and dissolved by the addition of 20 ml. of hydrazine hydrate and 100 ml. of dimethyl formamide. The solution is then mixed while stirring well, with 600 ml. of water. A yellow precipitate is thereby obtained, which is filtered off, washed with water and dried in vacuo at 30°. A greenish yellow pigment powder is obtained which, when contained in stoving lacquers, exhibits a considerably improved transparency compared with the starting pigment.

Example 13

1.5 g. of bis-[4,5,6,7-tetrachloro-isoindolin - 3 - one-1-ylidene]-phenylene diamine-(1,4) are suspended at room temperature in 150 ml. of pyridine and dissolved by the addition of 10 g. of benzyl-trimethyl ammonium hydroxide. The solution is subsequently mixed, while stirring well, with 600 ml. of water and 20 ml. of acetic acid. The obtained fine precipitate is filtered off, washed with water and dried in vacuo at 60°. A yellow pigment powder is obtained which when processed into stoving lacquers, is characterised by a clearly improved transparency compared with the starting pigment.

If instead of using in this example the 150 ml. of pyridine, a mixture of 450 ml. of dimethyl formamide and 100 ml. of water is used, and instead of the 10 g. of benzyl-trimethyl ammonium hydroxide, 6.6 g. of potassium carbonate are used, a pigment having similar properties is obtained.

Example 14

15 ml. of a 2 N sodium methylate solution are poured at room temperature into a suspension of 4.4 g. of 1,3-bis-[2,5-dichloro - 4' - chloro-benzoyl - amino) - phenylamino-1]-4,5,6,7-tetrachloro isoindoline in 150 ml. of dimethyl formamide. The solution, which is formed after a short time, is mixed, while stirring well, firstly with 500 ml. of water and then with 20 ml. of acetic acid. The obtained orange precipitate is filtered off, washed with water, dried in vacuo at 50–60° and pulverised. When processed into stoving lacquers, this pigment produces a pure orange dyeing, which is more deeply coloured and appreciably more transparent than a corresponding dyeing obtained with the starting pigment.

If instead of using the 4.4 g. of 1,3-bis[2,5-dichloro-4-(4' - chlorobenzoylamino) - phenylamino - 1] - 4,5,6,7-tetrachloro-isoindoline 4.4 g. of 1,3-bis-[4-chloro-5-(2', 5'-dichloro benzoyl-amino)-phenylamino - 1] - 4,5,6,7-tetrachloro-isoindoline are used, with the procedure being otherwise as described in this example, a highly transparent, deeply coloured, greenish yellow pigment is obtained.

Example 15

5.73 g. of 1,3-bis-[2,4-dichloro-phenylamino-1]-4,5,6,7 - tetrachloro - isoindoline are dissolved in 25 ml. of dimethyl formamide by the addition of 10 ml. of a 1 N solution of sodium methylate in methanol at room temperature. This solution is then mixed, while stirring well, with 100 ml. of water. The obtained yellow precipitate is filtered off, washed free of alkali with water and is dried in vacuo at 60°. After grinding, a yellow powder is obtained which is suitable for the pigmenting of stoving lacquers containing aluminium bronze. The greenish yellow stoving lacquers have a high colour strength and transparency. The transparency of the starting product is greatly improved by the described treatment.

If instead of using 5.73 g. of 1,3 - bis - [2,4 - dichlorophenylamino-1]-4,5,6,7-tetrachloro-isoindoline, 5.93 g. of 1,3-bis-[4 - sulphamoyl-phenylamino-1] - 4,5,6,7 - tetrachloro-isoindoline are used, or 4.35 g. of 1,3-bis-[phenylamino]-4,5,6,7-tetrachloro-isoindoline, with the procedure being otherwise as stated in this example, a pigment is obtained which is more greenish, more deeply coloured and more transparent than the corresponding starting pigment.

Example 16

7.78 g. of the red bis-[4,5,6,7-tetrachloro-isoindolin-3-one -1-ylidene] - 3,3' - dimethoxy diphenylene diamine-(4,4') and 7.18 g. of the orange bis-[4,5,6,7-tetrachloro-isoindolin-3-one-1-ylidene] - diphenyl diamine-(4,4') are suspended together in 190 ml. of dimethyl formamide. After brief stirring, a clear solution is formed after the addition of 7.71 g. of a 29.4% solution of sodium methylate in methanol at room temperature. The solution is then mixed, while stirring vigorously, with 500 ml. of water. After stirring for 3 hours, the obtained brown-red precipitate is filtered off, the filtrate washed neutral with water and dried in vacuo at 60°. 14 g. of a yellowish red pigment powder are obtained, which is suitable both for processing into soft polyvinyl chloride and for the pigmenting of stoving lacquers, enabling purer, more deeply coloured and much more transparent dyeings to be obtained, than would be obtainable with mechanical mixing of the two starting pigments in the same proportions.

If 5 g. of this conditioned pigment mixture in 100 ml. of o-dichlorobenzene are heated for 2 hours at 130°, filtered with suction after cooling to room temperature, the filtrate being then washed with ethanol and dried at 60° in vacuo, the subsequently treated pigment mixture exhibits the same valuable properties as the conditioned pigment mixture not subsequently treated.

Example 17

A solution of 2.7 g. of sodium methylate in 60 ml. of methanol is mixed with 15 g. of 3,4,5,6-tetrachloro-2-cyano-benzoic acid methyl ester. The sodium salt of the 1,1-dimethoxy-4,5,6,7-tetrachloro-isoindoline - 3 - one is thereby obtained. The solution is mixed with 2.7 g. of p-phenylene diamine and the reaction mixture is then stirred for 3 hours at room temperature, whereby the yellow sodium salt of the formed bis-[4,5,6,7-tetrachloro-isoindole-3-one-1-ylidene]-phenylene diamine (1,4) precipitates out. The reaction mixture is subsequently refluxed for 2 hours. After cooling to room temperature, 200 ml. of dimethyl formamide are poured in, whereby an almost clear yellow solution is obtained. From this solution is obtained a fine, yellow precipitate by the addition of 500 ml. of water. After stirring for 10 minutes and then filtering, the filtrate is washed neutral with a lot of water and is dried in vacuo at 60°. 16 g. of a greenish yellow pigment powder are obtained, which corresponds in shade, colour strength and transparency to the conditioned pigment obtained according to Example 1, and has a specific surface area of 70 m.$^2$/g.

Example 18

10 g. of 1,3-bis-2,4-dichloro-phenylamino-1,4,5,6,7-tetrachloroisoindoline are moistened with 5 ml. of dimethylformamide. Then 3.2 ml. of 30% methanolic sodium methylate solution are added thereto and the resulting mass thoroughly kneaded. An orange coloured broth is formed. Water (75 ml.) is then added in three amounts of 25 ml. each, the mixture being thoroughly stirred after each addition and then diluted with a further 300 ml. of water. The resulting suspension is acidified with 5 ml. glacial acetic acid, thoroughly stirred and the yellow precipitate is filtered off. The filtrate is dried in vacuo at 60° C. to yield a yellow powder which is suitable for pigmenting stoving lacquers containing aluminium bronze. The greenish yellow stoving lacquers and varnishes possess high tinctorial strength and great transparency. The described treatment increases the specific surface area (BET method) of the pigment by 20 m.$^2$/g. and also improves the transparency of the starting product.

Example 19

15 g. of bis - 4,5,6,7 - tetrachloroisoindolin - 3 - one-1-ylidene-phenylenediamine (1,4), which has a specific surface area of 22 m.$^2$/g. (BET method), are made into a paste with 10 ml. of dimethylformamide. This paste is subsequently treated with 8.3 g. of a 30% methanolic sodium methylate solution. A homogeneous, orange coloured broth is obtained by thorough mixing. Water (75 ml.) is then added in three portions of 25 ml. each with thorough mixing after each addition. The resulting brown paste is introduced into 500 ml. of water, thoroughly mixed and the resulting suspension subsequently acidified with 10 ml. of acetic acid. The finely distributed yellow pigment is thus obtained. It is collected by suction filtration, washed with water until neutral and dried in vacuo at 60° C. The thus modified pigment has a specific surface area of 53 m.$^2$/g. and incorporated in a stoving lacquer possesses great transparency.

Example 20

A dyeing paste for printing purposes is produced by mixing and grinding on the three-roller-mill the following constituents:

2 g. of the pigment obtained according to Example 5 with
36 g. of hydrate of alumina,
60 g. of linseed oil varnish of medium viscosity, and
0.2 g. of cobalt linoleate.

The pure, orange-coloured printings produced with this dyeing paste are highly transparent, deeply coloured as well as having excellent fastness to light.

Example 21

20 g. of suction filtrate (pigment content 25%) of the pigment conditioned according to Example 1 are stirred in 40 ml. of water. To this are added, while stirring, 14.3 g. of a 33% emulsion of a mixed polymerisation resin from styrene/ethyl acrylate. The suspension is then diluted with a further 33 ml. of water. While stirring well, the pH value of the suspension is adjusted to 4–5 with acetic acid and, using 3 g. of aluminium sulphate and 20 ml. of water, the resin in the presence of the pigment is precipitated. The reaction mixture is briefly heated to boiling and is again cooled before filtering. The washed pigment/resin mixture is dried in vacuo at 30–40°.

A hard polyvinyl chloride sheet is dyed by mixing together the following constituents and rolling them for 5 minutes at 170–180°:

0.3 g. of the above pigment/resin mixture with
100 g. of polyvinyl chloride (Hostalit C 260; K-value 60; Farbwerke Höchst, Germany)
2 g. of a pulverulent barium/cadmium complex (Mark 99; Argus Chemical, Brussels)
1 g. of an antioxidant and chelating agent (Mark C; Argus Chemical, Brussels) and
1 g. of octyl-epoxy stearate.

This mixture is now pressed under pressure at 190–200° into the mould. After a waiting time of 4 minutes the mould is again cooled. The sheets dyed in this manner in a yellow shade are completely clear and transparent and are characterised by a good fastness to weathering.

Metal-effect synthetic leather is dyed by mixing together 1 g. of the above pigment/resin mixture with 0.5 g. of an aluminium paste (consisting of 65% of aluminium and 35% of dioctyl phthalate), 100 g. of polyvinyl chloride (Sicron 708, K-value 70, Montecatini Edison, Milano), 60 g. of dioctyl phthalate, 5 g. of dioctyl adipate and 2.5 g. of a barium/cadmium/zinc complex as stabiliser, and passing the mixture through the three-roller-mill. Release paper (type Trans-Cote) is coated with this material. The coated paper is chelated by heating it for 6 minutes at 180°, the paper being then suitable for processing into synthetic leather. The synthetic leather thus dyed in a yellow shade, has a good metal effect and is characterised by having a good fastness to rubbing, migration and light.

Example 22

4 g. of nonleafing aluminium paste (Strapa NL 44, 65% aluminium, Eckart Werke, Furth), and 1 g. of the pigment produced according to Example 1 are ground during 72 hours in a ball mill with 95 g. of a mixture of 26.4 g. of coconut-oil alkyd resin, 24.0 g. of melamine formaldehyde resin (50% solid content), 8.8 g. of ethylene glycol monomethyl ether and 35.8 g. of xylol.

If this lacquer is sprayed on to aluminium foil and stoved, after 30 minutes preliminary drying at room temperature, for 30 minutes at 120°, a metal-effect lacquering in a yellow shade is obtained, whereby the structure of the aluminium powder remains completely visible. The lacquering has very good fastness to cross-lacquering and light.

We claim:
1. A process for the improvement of colour strength, brilliance and transparency of isoindoline pigments, in which
(a) 1 part of a pigment of the formulae

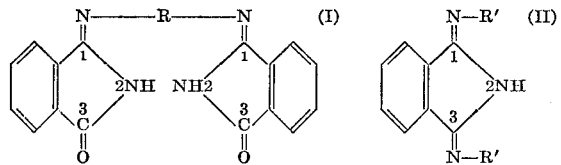

wherein
R represents an unsubstituted dibenzofurane radical, an unsubstituted phenylene or diphenylene radical or a phenylene or diphenylene radical substituted by chlorine atoms, methyl, methoxy or sulfonamide groups, and
R' is unsubstituted phenyl or a phenyl radical substituted by chlorine atoms, benzoylamino, chlorobenzoylamino or sulfonamide groups,
in which formulae the benzo rings may be further substituted by halogen atoms, is suspended in at least 0.5 part of hydrophilic organic solvent,
(b) to the resulting suspension is added an alcoholate, amide, hydroxide, or carbonate of an alkali metal, or a hydroxide or oxide of an alkaline-earth metal, and
(c) the resulting pigment is mixed with water or a lower aliphatic carboxylic acid in order to obtain the respective isoindoline pigment in free acidic form.

2. A process as claimed in claim 1, wherein at least 2 parts of the hydrophilic solvent is used per part of pigment.
3. A process as described in claim 1, wherein step (c) is carried out by adding to the reaction mixture from step (b) water at room temperature.
4. A process as described in claim 1, wherein step (c) is carried out by adding to the reaction mixture from step (b) the lower aliphatic carboxylic acid at room temperature.
5. A process as described in claim 4, wherein said acid is diluted acetic acid.
6. A process as described in claim 1, wherein said hydrophilic organic solvent is selected from dimethyl formamide, isopropanol, pyridine and mixtures thereof.
7. A process as described in claim 1, wherein said base is alkali metal alcoholate.
8. A process as described in claim 7, wherein said base is sodium methylate.

References Cited
UNITED STATES PATENTS

| | | | |
|---|---|---|---|
| 3,496,190 | 2/1970 | Von der Crone et al. | 260—325 |
| 2,973,358 | 2/1961 | Pugin | 260—240 |

JOSEPH A. NARCAVAGE, Primary Examiner

U.S. Cl. X.R.

106—20, 193, 253, 288; 260—37, 39, 40, 41, 326.1